July 19, 1932.  M. L. TINKLEPAUGH ET AL  1,867,636
SIEVE ATTACHMENT FOR EAVES TROUGHS
Filed June 27, 1930    2 Sheets-Sheet 1
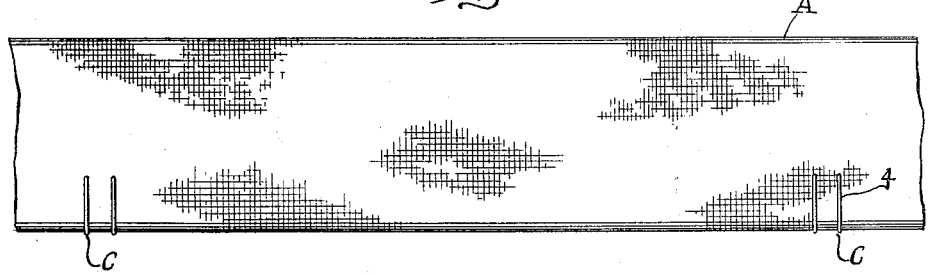
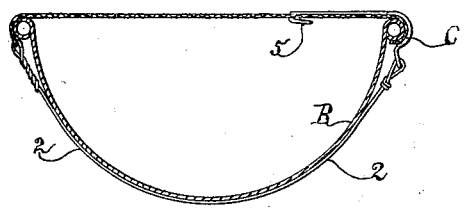
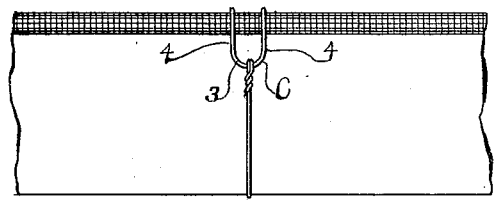

July 19, 1932. M. L. TINKLEPAUGH ET AL 1,867,636
SIEVE ATTACHMENT FOR EAVES TROUGHS
Filed June 27, 1930 2 Sheets-Sheet 2
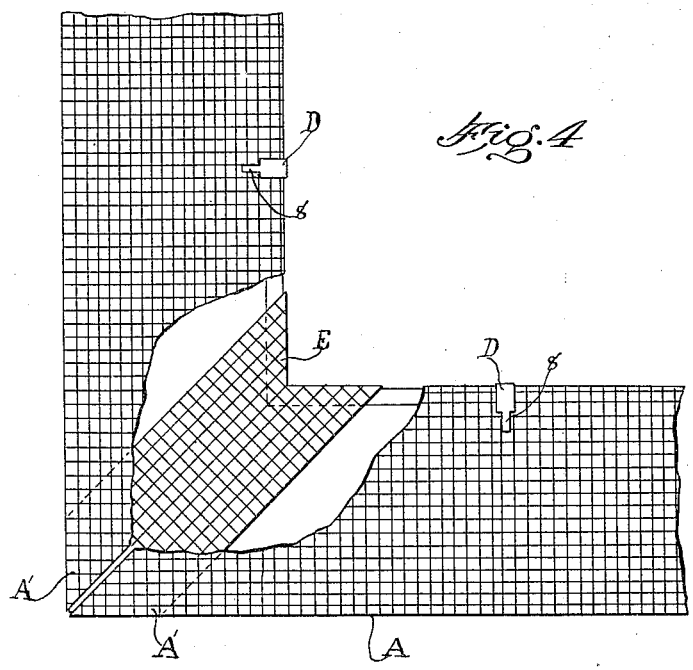
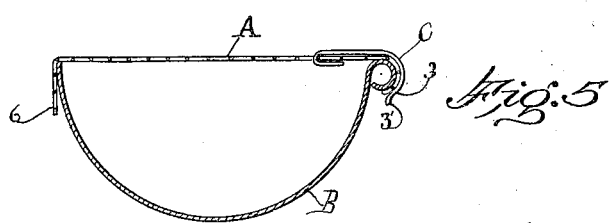
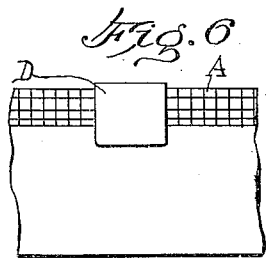 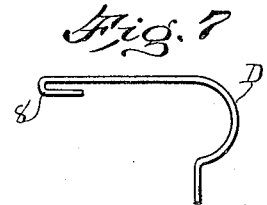

Patented July 19, 1932

1,867,636

UNITED STATES PATENT OFFICE

MARK L. TINKLEPAUGH, OF BINGHAMTON, AND GEORGE W. HOWE, OF WAVERLY, NEW YORK

SIEVE ATTACHMENT FOR EAVES TROUGHS

Application filed June 27, 1930. Serial No. 464,199.

Our invention relates to a sieve attachment for eaves troughs, and it has for its object to provide means for preventing leaves and other débris or foreign material entering the eaves trough and clogging up the same and the down spout which is usually associated with the eaves trough. A further object of the invention is to provide screens for the open ends of the eaves trough and means for preventing displacement of the screens.

A still further object of the invention is to provide screens removably held over the eaves trough for filtering or straining the water of foreign material before entering the eaves trough.

With these objects in view our invention consists of the following novel features of construction and arrangement of parts, as are more particularly hereinafter described and pointed out in the claims, reference being had to the accompanying drawings in which:—

Fig. 1 is a plan view of a section of our device,

Fig. 2 is a transverse sectional view of our device as applied to an eaves trough.

Fig. 3 is a front view in elevation, of our device as applied to a trough,

Fig. 4 is a plan view of a sieve as mounted on a trough at an elbow union of our device, Fig. 5 is a transverse sectional view of a modified form of a detailed part of our device, Fig. 6 is an elevation of a portion of a modified form of a detailed part of our device, Fig. 7 is an end elevation of a modified form of a detailed part of our device.

The same reference characters denote like parts in each of the several figures of the drawings.

In carrying out our invention, A represents a section of screen wire which may or may not have a rolled over and crimped edge along its outer side, that is, the side away from the building or house to which the eaves trough is applied, or such outer side may have its end turned down at an angle, preferably a right angle as shown at 6 in Fig. 5 of a modified form of my device. The screen wire may be made of different sizes of mesh as is deemed necessary and desirable.

In the preferred form of our device, we may have a hook or other means of attaching a link or strand of copper wire 2. This wire may be formed of any other metal or other suitable material. On the front edge of our device, we have removably mounted the two pronged clamping device C, as shown in Figs. 1 and 3. These clamping devices C may each have in its formation the cross bar 3, and the parallel side members 4, 4, each having at its inner end the hook formation 5, as shown in Figs. 1, 2, and 3. In attaching or placing the section of screen A over the trough B, we may attach to the inner edge the copper wire 2, as shown in Fig. 2. The free end of the copper wire 2 may be attached to the clamp C in any suitable manner such as twisting it about the bar 3. The wire is then drawn taut and the hook members 5, 5 are inserted into the meshes of the wire screen. It will thus be seen that the screen is removably yet rigidly held in place over the open end of the eaves trough.

In another form of our device, as shown in Fig. 5, we turn over the back edge of the screen section A, into the vertical formation 6, as shown in Fig. 5, while the front edge of A, 7, rests upon the roll of the trough B, as shown in Fig. 5. To this may be mounted the clamp C, which has at its lower edge 3 a slight lip projection or bend 3', as shown in Fig. 5. In a further modified form of our device, the clamp holding the wire screen A to the trough may be of sheet metal material, D, as shown in Fig. 6, and Fig. 7; having the inner projecting clamping end 8, as shown in Fig. 4 and Fig. 7, which clamp into, and which hook into the mesh of screen A, as shown in Figs. 4, 6 and 7, and thus we removably attach the wire screen and hold it to the trough in a convenient manner. The clamps C and D may be any suitable distance apart as the occasion requires. At the elbow we shape the ends of the sieve sections A on a bevel, and mount upon the elbow the section E shaped as shown in Fig. 4, and allow the beveled ends of the sieve section A to rest thereon, forming a neat and firm support for the ends A' at an elbow. In this easy and convenient way the trough B is always kept from filling in with leaves or other form of débris, but at the same time left free for the percolation of eaves water or rain water, in the usual manner. The leaves resting upon the screen permits a free circulation of air, and immediately drying out and being blown away, and automatically removed.

Having described our invention, what we claim as new and for which we desire Letters Patent, is as follows:

1. An attachment for eaves troughs comprising a section of wire mesh disposed over the side edges of the trough, a bent portion along the outer edge of the wire mesh for engaging the outer edge of the trough, hook members penetrating the wire mesh along its inner edge, and flexible means extending around under the trough body and secured to the hook members and the bent outer edge of the wire mesh.

2. In an attachment for eaves troughs, a section of wire mesh disposed along the eaves trough and supported on the upper edges thereof, the outer edge of the wire mesh section being bent at an angle to the body portion to engage over the outer edge of the trough, and removable clamping means hooked over the inner edge of the trough and engaging the wire mesh.

3. An attachment for eaves troughs comprising a section of wire mesh disposed over the eaves trough and having its outer edge bent at an angle to the body portion to hook over the outer edge of the eaves trough, and clamping hooks having their hooked ends penetrating the wire mesh along the inner edge thereof, and their other ends embracing the inner edge of the eaves trough.

4. A screen attachment for elbows of eaves troughs, comprising a narrow screen section extending across the eaves trough at the elbow, screen sections extending along the arms of the elbow and having their meeting edges beveled and supported by the screen sections, said screen sections also resting on the upper edges of the arms of the eaves trough, the outer longitudinal edges of the screen sections being bent around the inner edges of the eaves trough, and clamping means having portions engaging the inner edges of the eaves trough and having hook portions for penetrating the wire mesh.

In testimony whereof we have affixed our signatures.

MARK L. TINKLEPAUGH.
GEORGE W. HOWE.